Jan. 12, 1960 H. E. COOK 2,920,802
CAR TOP LUGGAGE CARRIER
Filed Aug. 11, 1958 2 Sheets-Sheet 1
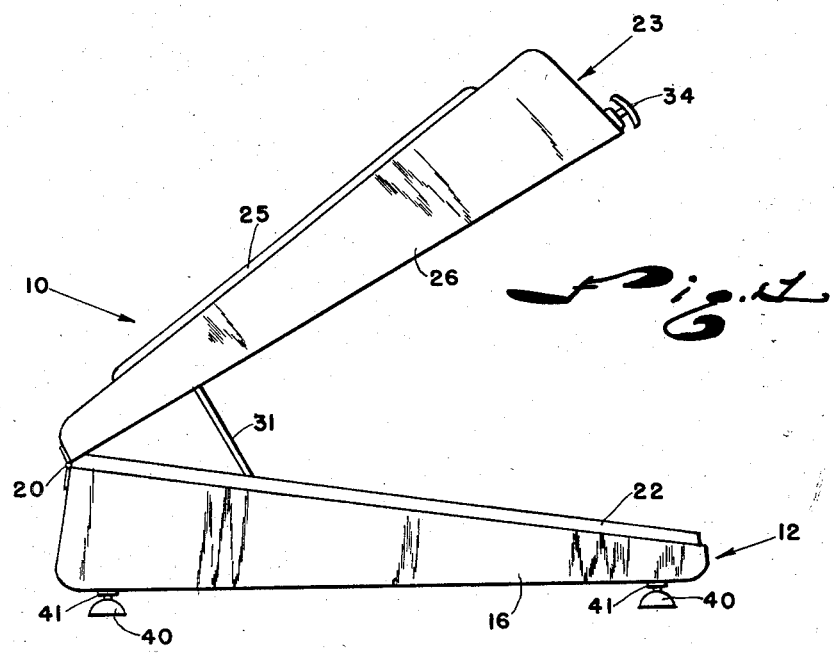
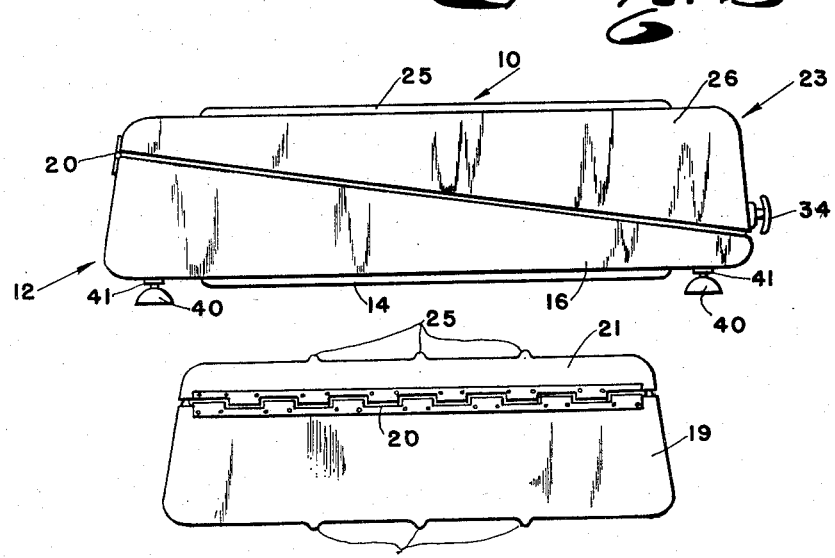
INVENTOR.
HENRY E. COOK Jan. 12, 1960
H. E. COOK
2,920,802
CAR TOP LUGGAGE CARRIER
Filed Aug. 11, 1958
2 Sheets-Sheet 2
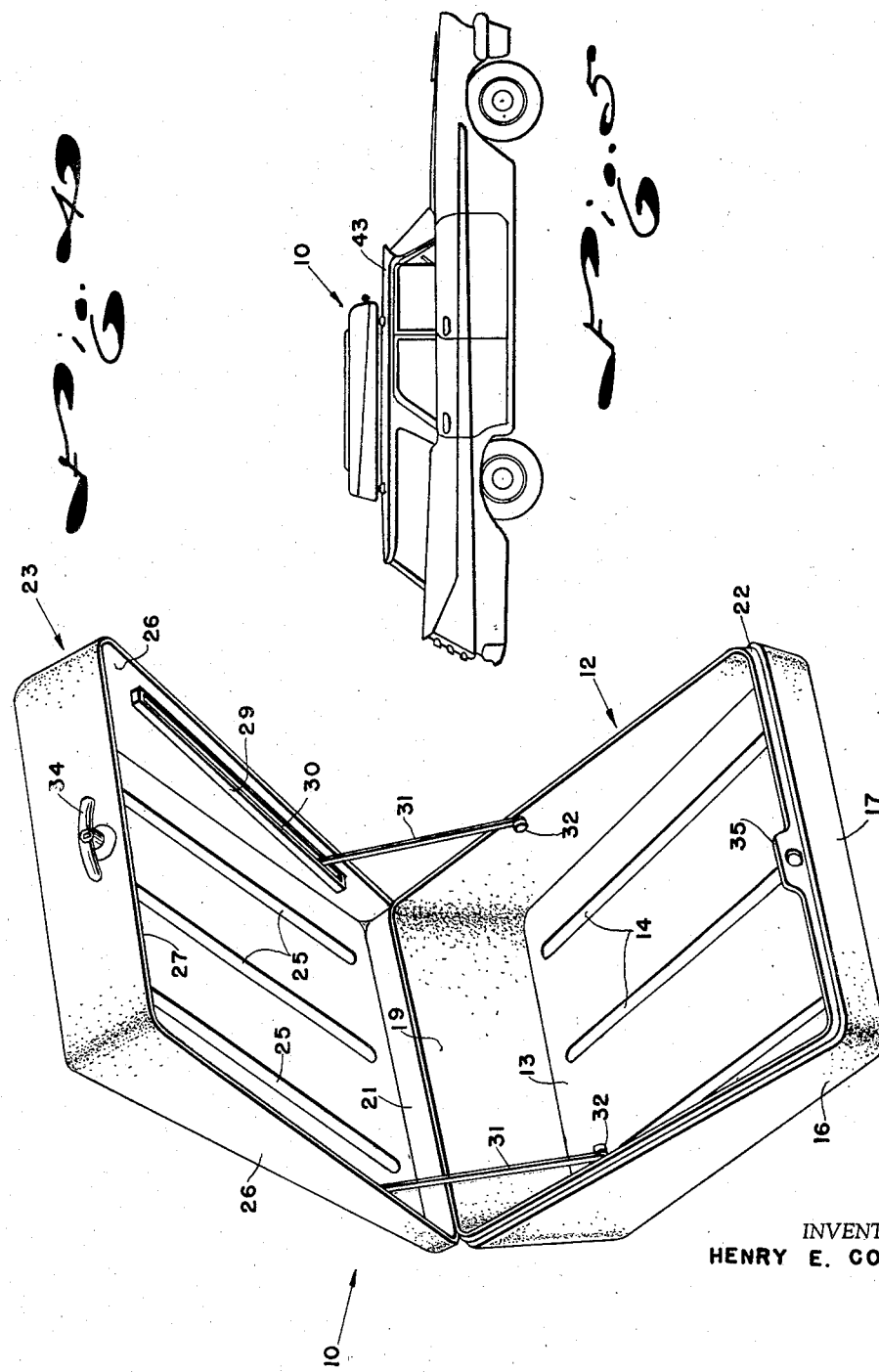
*INVENTOR.*
HENRY E. COOK United States Patent Office 2,920,802
Patented Jan. 12, 1960

2,920,802

CAR TOP LUGGAGE CARRIER

Henry E. Cook, Wichita, Kans.

Application August 11, 1958, Serial No. 754,409

2 Claims. (Cl. 224—42.1)

This invention relates to automotive vehicles and, more particularly, to an accessory therefor.

It is an object of the present invention to provide a luggage carrier for attachment to the roof of automotive vehicles that will facilitate the carrying of various types of articles and luggage without damage to the finish or structure of the vehicle.

Another object of the present invention is to provide a car top luggage carrier having self contained securing means which will securely fasten the luggage carrier to the roof of the vehicle without the addition of external fastening elements which might otherwise damage the vehicle or accidentally loosen during the use thereof.

Still a further object of the present invention is to provide a car top luggage carrier of the above type that is completely waterproof, tamperproof, and which is streamlined so as to present a minimum amount of resistance to travel of the vehicle at high speeds.

Other objects of the invention are to provide a car top luggage carrier bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a car top luggage carrier made in accordance with the present invention in an open position;

Figure 2 is a view similar to Figure 1, showing the carrier in a closed position;

Figure 3 is a rear elevational view of the carrier shown in Figure 2;

Figure 4 is a perspective view of the carrier shown in an open position; and

Figure 5 is a side elevational view of a carrier made in accordance with the present invention in operative use.

Referring now more in detail to the drawing, a luggage carrier 10 for automotive vehicles made in accordance with the present invention is shown to include a base 12 having a floor panel 13, forwardly tapering side walls 16, a front end wall 17, and a rear wall 19 of substantially larger size than the front end wall 17. The floor panel 13 includes longitudinal stiffener ribs 14 which substantially increase the strength thereof and provide somewhat of a streamlining effect.

A cover member 23 having a top panel 24 that is similarly provided with longitudinal stiffener ribs 25, also includes rearwardly tapering side walls 26, a front end wall 27, and a substantially smaller rear end wall 21. A piano type hinge 20 hingedly connects the rear end wall 21 of the cover member 23 to the rear wall 19 of the base member for selective movement between an open and a closed position. The base wall panels also include a continuous, annular and upwardly extending lip 22 that is received within the interior of the cover member when the parts are in the closed position shown in Figure 2, to further effect a waterproof seal therebetween to prevent the entry of water and moisture when travelling at high speeds in inclement weather.

A housing 29 having a longitudinally and downwardly opening slot 30 is secured to each side panel 26 of the cover member 23. The upper ends of a pair of braces 31 are slidably received within the slots 30 of the housings 29, while the opposite ends thereof are rotatably secured, by means of pivot pins 32 to the side panels 16 of the base member 12. These braces 31, together with the slotted housings 29, provide an adjustable sliding catch assembly which is operative to secure the cover member in any desired adjusted open position for facilitating the loading and unloading of luggage relative to the interior of the carrier. A lock handle 34 carried by the cover member 23 cooperates with a keeper 35 integral with the base member 12 to selectively lock the carrier in a closed position against opening by unauthorized persons.

Each corner of the floor panel 13 of the base member 12 is provided with a depending universal joint 41 which supports a suction cup 40 for securing engagement with the roof 43 of a vehicle. The swivel type joints 41 enable the suction cups 40 to be moved to substantially any position for accommodating vehicles of different makes and types. The suction cups 40 are preferably industrial type suction cups having sufficiently large enough area to secure the luggage carrier safely to the top of the vehicle. As a result, it is not necessary to use additional external fastening means for securing the luggage carrier in place, even when the vehicle is used in inclement weather and driven at high speeds.

If desired, all of the parts of the luggage carrier may be selectively constructed from steel, aluminum, or the base and cover members may be formed from aluminum, fiber glass, plastic, or the like. Each carrier may be painted substantially the same color as the vehicle to enable it to blend with the finish of the car and to further enhance its appearance during use. Similarly, the suction cups 40 may be constructed of any desired material, preferably an inert plastic material that will not adversely affect the finish of the vehicle. On the other hand, magnets or hydraulic securing means may be substituted for the suction cups, should such be desired, to provide still different types of means for releasably securing the carrier to the vehicle.

While various changes may be made in the detail construction, it shall be understood that such changes shall be within the spirit and scope of the present invention as defined by the appended claims.

What I claim as new and desire to protect by Letters Patent of the United States is:

1. A luggage carrier for attachment to the curved top surface of an automobile comprising, in combination, a two-piece body having a base member and a cover member pivotally connected together for selective movement between an open and a closed position, said base member having a floor panel integrally connected with upstanding front and rear inwardly sloping walls and a pair of upstanding side inwardly sloping walls, said cover member having a top panel integrally connected with depending front and rear outwardly sloping walls and a pair of depending side outwardly sloping walls, said upstanding front wall being of less height than said upstanding rear wall, said upstanding side walls sloping forwardly and downwardly from the upper end of said upstanding rear wall to the upper end of said upstanding front wall, the upper edges of said upstanding front and rear walls and said upstanding side walls terminating in a continuous, annular and upwardly extending lip that is received within the interior of said cover member, said depending front wall being of greater height than said depending rear wall, the lower edges of said depending side walls sloping forwardly and downwardly from the lower end of said depending rear wall to the lower end of said depending front wall, and hinge means pivotally connected to the exterior surface of said cover member at the lower end of its depending rear wall and to said base member at the upper end of its upstanding rear wall and mounting said cover member for swinging movement into and out of closing relation relative to said base member, a lock having portions carried by the forward ends of said base member and said cover member selectively securing said cover member in closed position against unauthorized access to the interior of said two-piece body, suction cup type fastening means pivotally secured to the lower exterior surface of said floor panel for securing said base member to the curved top surface of the automobile upon which it is mounted, said base member and said cover member when closed having the shape of a traveling case with parallel upper and lower surfaces and downwardly and outwardly sloping front, side and rear walls.

2. The combination according to claim 1, further comprising longitudinal outwardly extending stiffener ribs integral with each of said floor panel and said top panel.

References Cited in the file of this patent

UNITED STATES PATENTS

| | | |
|---|---|---|
| 59,136 | Quick | Oct. 23, 1866 |
| 1,586,463 | Paquette | May 25, 1926 |
| 2,454,366 | Worley | Nov. 23, 1948 |
| 2,812,992 | Lysen | Nov. 12, 1957 |
| 2,816,628 | Garfield | Dec. 17, 1957 |

FOREIGN PATENTS

| | | |
|---|---|---|
| 449,406 | Italy | June 18, 1949 |